United States Patent [19]
Cadas et al.

[11] Patent Number: 5,244,674
[45] Date of Patent: Sep. 14, 1993

[54] PROCESS FOR DEEP FREEZING COOKED POTATOES

[75] Inventors: Martial Cadas, Montreuil/Breche; Luc Jamet, Beauvais, both of France

[73] Assignee: Nestec S.A., Vevey, Switzerland

[21] Appl. No.: 997,209

[22] Filed: Dec. 28, 1992

[30] Foreign Application Priority Data

Jan. 25, 1992 [EP] European Pat. Off. ............ 92101214

[51] Int. Cl.$^5$ ............................................. A23L 3/00
[52] U.S. Cl. ...................................... 426/524; 62/65; 426/509
[58] Field of Search ............... 426/509, 510, 524, 637; 62/65

[56] References Cited

U.S. PATENT DOCUMENTS

| | | | |
|---|---|---|---|
| 4,031,253 | 6/1977 | Suortti et al. | 426/524 |
| 4,276,314 | 6/1981 | Andersen | 426/524 |
| 4,800,098 | 1/1989 | Galland | 426/637 |

FOREIGN PATENT DOCUMENTS 1597550  9/1981  United Kingdom ................ 426/509

*Primary Examiner*—George Yeung
*Attorney, Agent, or Firm*—Vogt & O'Donnell

[57] ABSTRACT

Deep-frozen cooked potatoes are prepared by cooking potatoes, slowly cooling the cooked potatoes and then deep-freezing the cooled potatoes to a storage temperature in two steps so that in the first step, the cores of the potatoes are kept at the crystallization state of water for at least 15 minutes and so that in the second step, deep-freezing is continued until the frozen storage temperature is reached.

6 Claims, No Drawings

PROCESS FOR DEEP FREEZING COOKED POTATOES

BACKGROUND OF THE INVENTION

This invention relates to a process for the production of potatoes cooked in water or steam and deep-frozen.

It is known that, unlike fried potatoes, potatoes cooked in water or steam do not lend themselves to deep-freezing. Irrespective of the variety of potato used, the deep-frozen product has a floury, soft and grainy, texture and shows surface exfoliation after reheating for consumption.

Thus, attempts to cook potatoes in water or steam and then to cool them, optionally in cold water, and finally to deep-freeze them by the conventional IQF (individual quick freezing) method, i.e., by circulation of air at −40° C. to obtain complete deep-freezing in a few minutes, have never provided a satisfactory product.

Now, it could be of advantage, particularly in the field of deep-frozen cooked dishes, to provide cooked potatoes which retain a texture comparable with that of an identical product which has not been deep-frozen.

French Patent Application No. FR-A-2 392 609, for example, describes a process for cooking potatoes in several stages followed by heating of the cooked product in air. According to this document, the product cooked by this process may then be deep-frozen and subsequently reheated for consumption with no deterioration in its texture.

The main disadvantage of this process is that it is difficult to carry out on an industrial scale. In addition, experience has shown that multistage cooking processes have a tendency to produce unpleasant tastes. This explains why, to applicant's knowledge, good quality cooked and deep-frozen potatoes have not yet been available on the market.

SUMMARY OF THE INVENTION

Accordingly, the object of the invention was to solve the problem noted above by providing a simple cooking process comparable with domestic cooking that would manage the cooling and deep-freezing conditions which, themselves, would remain simple.

The present invention relates to a process for the production of potatoes cooked and deep-frozen, in which potatoes are cooked in water or steam, cooled and then deep-frozen, the deep-freezing being carried out in two steps in such a way that, in a first step, the core of the potatoes is kept at the crystallisation state of water for at least 15 minutes and, in a second step, deep-freezing is continued until the storage temperature is reached.

In this way, surface exfoliation is eliminated and the floury texture is reduced and becomes smoother and firmer.

DETAILED DESCRIPTION OF THE INVENTION

In a first step, optionally peeled potatoes are cooked. They are preferably cooked with steam in known manner to avoid leaching of the product which would eliminate certain components. However, any other method of cooking, for example in water, may be applied if the taste characteristics of the product obtained are considered satisfactory.

It is preferred to use a variety of firm flesh potatoes, such as BF 15, particularly for the production of steam-cooked potatoes.

In addition, the calibre of the potatoes is itself an important parameter, the best results from the point of view of texture being obtained with small tubers, i.e., of a calibre below or equal to 35 mm. It is important in this regard to note that it is the calibre of the tubers which is important and not the size of the pieces treated after optional cutting of the tubers. This is because the structure and composition, particularly in regard to starch, of a small tuber are different from those of a larger tuber.

Finally, the dry matter content of the starting product is also important. With tubers having a dry matter content below 17% by weight, significant cooking heterogeneities appear. If the dry matter content exceeds 19% by weight, the floury texture appears far more readily.

It is also pointed out that, to derive maximum benefit from the advantages of the process, it is useful to optimize the cooking process and to adapt it to the particular potato to be treated. If cooking is too light, the product has a poor taste and a heterogeneous texture. If it is overdone, the product collapses irreversibly. In the case of a BF 15 below 35 mm in calibre, optimal cooking is obtained with steam over a period of 8 minutes.

After cooking, when they are at a temperature of about 95° C., the cooked potatoes undergo cooling. To this end, they could be exposed to a stream of air at a temperature between ambient temperature and 0° C. Cooling with cold air at a temperature around 0° C. is preferable for reasons of bacteriological safety.

To obtain a satisfactory end product, it is advisable for cooling to be sufficiently slow. More particularly, to avoid any deterioration in texture after deep-freezing, the core temperature of each potato should not reach ambient temperature in less than 10 minutes. In a preferred embodiment, the core of each potato should reach a temperature of 20° C. after cooling for 10 to 30 minutes. Beyond 30 minutes, the process still works, but becomes more difficult to carry out on an industrial scale.

In a preferred embodiment, cooling is carried out over a period of 15 minutes by exposure to a stream of air at a temperature of 0° C. circulating at a moderate flow rate of the order of 2 to 3 m/s. Quicker cooling, for example in cold water, followed by holding of the temperature and deep-freezing gives a less satisfactory result.

After cooling, the potatoes are deep-frozen.

Accordingly, deep-freezing is carried out in two steps in the process according to the invention. In a first step, the treatment conditions are such that the core of the potatoes is kept at the crystallization stage of water, i.e., at a temperature below 0° C., of the order of −1° to −2° C., for a period of 15 to 60 minutes. In a second step, the water in the product having frozen, the temperature of the product is brought to its storage temperature, i.e., below −20° C.

This slow deep-freezing is necessary to avoid deterioration of the texture. If the crystallization stage representing the first deep-freezing step is less than 15 minutes in duration, the product collapses and the floury texture does not disappear completely despite the preliminary cooling. If this stage lasts longer than 60 minutes, the process, although still working, becomes difficult to carry out on an industrial scale. In addition, prolonged contact with air could initiate oxidation reactions which should be avoided because they degrade the product.

It should be noted in this regard that the deep-freezing process can be carried out on potatoes vacuum-packed after cooling rather than on loose potatoes so that the risks of subsequent oxidation are eliminated. In this case, it is important that vacuum packing is carried out after cooling because, when the potatoes have been vacuum-packed before cooling, the taste of the end product has been judged less good.

In order, in a preferred embodiment, to reach the crystallization stage and then to lower the temperature of the product to its storage temperature, deep-freezing is carried out in three treatment phases. The first phase lasts 15 minutes and comprises exposure to an air stream at a temperature of −5° C. flowing at a rate of 4 m/s. The second phase also lasts 15 minutes and comprises exposure to an air stream at a temperature of −15° C. flowing at a rate of 9 m/s and then exposure to an air stream at a temperature of −20° C. flowing at a rate of 9 m/s. Thus, the crystallization stage lasts about 15 minutes.

The end product obtained shows no exfoliation and has a reduced floury texture. This product has organoleptic characteristics, after reheating for consumption, very similar to those of an identical product subjected to the same cooking treatment and consumed directly without deep-freezing.

EXAMPLES

The following Examples illustrate the comparison of the process according to the invention with, on the one hand, a conventional IQF deep-freezing method and, on the other hand, a theoretical process in which the crystallization stage lasts 2 hours. In the three Examples, the potatoes treated are the same.

EXAMPLE 1

The potatoes were subjected after cooking to rapid cooling so that the core of the potatoes was brought to ambient temperature in 5 minutes. The crystallization stage lasted 5 minutes, after which the potatoes were deep-frozen to −40° C., the complete cycle consisting of cooling, the crystallization stage and the final deep-freezing phase lasting 18 minutes.

Exfoliated tubers with a sandy, collapsed texture (soft and grainy) were obtained. The product is not satisfactory.

EXAMPLE 2

The potatoes were subjected after cooking to slow cooling so that the core of the potatoes was brought to ambient temperature in 15 minutes. The crystallization stage lasted 20 minutes, after which the potatoes were deep-frozen to −40° C., the complete cycle consisting of cooling, the crystallization stage and the final deep-freezing phase lasting 65 minutes.

The product obtained in this way is entirely satisfactory.

EXAMPLE 3

The potatoes were subjected after cooking to very slow cooling so that the core of the potatoes was brought to ambient temperature in 30 minutes. The crystallization stage lasted 2 hours, after which the potatoes were deep-frozen to −40° C., the complete cycle consisting of cooling, the crystallization stage and the final deep-freezing phase lasting 3 hours.

Although the tubers are intact and their texture smooth, there are signs of discoloration and degradation of taste characteristic of incipient oxidation.

In addition, tests were carried out to study the effect of the duration of the crystallization stage on texture. In these tests, the potatoes were subjected after cooking to slow cooling so that the core of the potatoes was brought to ambient temperature in 15 minutes.

Deep-freezing was carried out in such a way that crystallization stages of 5, 10, 15, 20, 30 and 60 minutes were obtained.

The results are set out in the following Table.

| Crystallization stage | Texture of the product |
| --- | --- |
| 5 minutes | sandy, product soft and grainy |
| 10 minutes | floury, product soft and mealy |
| 15 minutes | slightly floury, product slightly firm and mealy |
| 20 minutes | satisfactory, product firm and smooth |
| 30 minutes | satisfactory, product firm and smooth |
| 60 minutes | satisfactory, product firm and smooth |

The sample obtained with a crystallization stage of 60 minutes shows slight degradation of taste which signifies a danger of degradation in storage.

The invention thus provides a simple treatment for cooked potatoes which eliminates the problems normally encountered in the deep-freezing of potatoes cooked in water or steam.

We claim:

1. In a process for the production of cooked, deep-frozen potatoes in which potatoes are cooked in water or steam, cooled and then deep-frozen to a frozen storage temperature, the improvement comprising deep-freezing the cooled potatoes in two steps so that, in a first step, the core of the potatoes is kept at the crystallization state of water for at least 15 minutes and so that, in a second step, deep-freezing is continued until the frozen storage temperature is reached.

2. A process according to claim 1 wherein the cooked potatoes are cooled so that the core temperature of the potatoes falls to ambient temperature over a period of more than 10 minutes.

3. A process according to claim 1 wherein the cooling is carried out by exposure to flowing air.

4. A process according to claim 3 wherein the cooling is carried out over a period of 15 minutes by exposure to a stream of air having a temperature of 0° C. flowing at a rate of from 2 m/s to 3 m/s.

5. A process according to claim 1 wherein the potatoes to be treated are tubers below 35 mm in calibre.

6. A process according to claim 5 wherein the potatoes to be treated have a dry matter content of from 17% to 19% by weight.

* * * * *